United States Patent [19]

Kainuma

[11] Patent Number: 5,046,189
[45] Date of Patent: Sep. 3, 1991

[54] FACSIMILE APPARATUS AND METHOD OF TRANSMITTING MANAGEMENT INFORMATION

[75] Inventor: Hirosuke Kainuma, Yokohama, Japan

[73] Assignee: Ricoh Company, Ltd., Tokyo, Japan

[21] Appl. No.: 463,319

[22] Filed: Jan. 10, 1990

[30] Foreign Application Priority Data

Jan. 23, 1989 [JP] Japan .................................. 1-11970

[51] Int. Cl.⁵ ...................... H04M 11/00; H04N 1/00; H04N 1/42
[52] U.S. Cl. ........................................ 379/100; 379/93
[58] Field of Search ......................... 379/100, 93, 112; 358/403

[56] References Cited

U.S. PATENT DOCUMENTS

| | | | |
|---|---|---|---|
| 4,432,020 | 2/1984 | Ohose et al. | 379/100 |
| 4,893,333 | 1/1990 | Baran et al. | 379/100 |
| 4,918,722 | 4/1990 | Duehren et al. | 358/407 |
| 4,961,185 | 10/1990 | Sawada | 379/100 |
| 4,988,209 | 1/1991 | Davidson et al. | 379/96 |

FOREIGN PATENT DOCUMENTS

55-158767 12/1980 Japan .
62-27262 10/1987 Japan .

*Primary Examiner*—Jin F. Ng
*Assistant Examiner*—Stella L. Woo
*Attorney, Agent, or Firm*—Oblon, Spivak, McClelland, Maier & Neustadt

[57] ABSTRACT

A facsimile apparatus for communicating via an integrated service digital network comprises a reading part for reading a user information attached to a call setup message upon reception and acceptance of a call from other terminals sent via the network, a discrimination part for discriminating the existence, in the user information, of a request for sending a management information to the terminal which has sent the call and further for identifying the type of the requested management information, and a conversion part for converting the requested management information into an image information and for transmission to the terminal requesting the management information via the network.

5 Claims, 5 Drawing Sheets

FACSIMILE APPARATUS AND METHOD OF TRANSMITTING MANAGEMENT INFORMATION

BACKGROUND OF THE INVENTION

The present invention generally relates to facsimile apparatuses and more particularly to a facsimile apparatus for use in a so-called integrated service digital network (ISDN).

Construction of ISDN is currently in progress in various countries. In Japan, for example, commercial service of ISDN using a basic user/network interface has been started since April, 1988.

In the ISDN, various bearer services different in the bearer capability are provided such as a 64 kbps audio bearer service for telephones, a 64 kbps audio bearer service at 3.1 kHz for the G2/G3 facsimiles, a 64 kbps unlimited bearer service for the G4 facsimiles, and the like. The user selects one of these bearer services which matches to his or her terminal.

Meanwhile, facsimile apparatuses in these days use various functions such as the so-called one-touch dialing function or abbreviated dialing function in which predetermined dial number of terminal is assigned to predetermined key or registered in a form of abbreviated dial number. Further, a communication managing function for logging the date, destination and the length of communication as well as the accounting, is becoming common. Further, increasing number of facsimile apparatuses are equipped with a so-called relay function in which an image information received together with a relay command is further transferred to another destination designated by the relay command. Usually, a facsimile apparatus having the foregoing one-touch dialing functions is capable of outputting the list of dial numbers stored therein. Similarly, a facsimile having the communication managing function is usually capable of outputting the communication log as a communication management report.

When using the foregoing functions and to relay the informations while designating the destinations by using the abbreviated dialing function or the one-touch dialing function, it is necessary to know the content of the one-touch or abbreviated dial number stored in the relaying terminal.

Further, there occurs rather frequently a case in which a head office of a chain store and the like operating a number of stores wishes to know the communication log of the facsimiles of the stores in the chain.

In these cases, it is usual that an operator at a central terminal or in the head office calls the operator at the terminals in the chain store by telephone and ask to send the necessary informations. Thus, there is an inconvenience such that the human operator has to intervene the process of transmitting various management informations between the facsimile apparatuses in spite of the fact that each of the facsimile apparatuses has a capability of storing the management informations and outputting them as necessary.

SUMMARY OF THE INVENTION

Accordingly, it is a general object of the present invention to provide a novel and useful facsimile apparatus wherein the foregoing problems are eliminated.

Another object of the present invention is to provide a facsimile apparatus for use in an ISDN system wherein the intervention of the operator can be eliminated for sending management informations upon request.

Another object of the present invention is to provide a facsimile apparatus constituting a terminal of an integrated service digital network, in which first means is provided for discriminating the existence of a request from other terminals asking for management informations and the type of the requested management information upon reception of a call setup message from the foregoing terminal, on the basis of a user-to-user information attached to the call setup message, and further for sending the corresponding management information to the terminal requesting the management information, and in which second means is provided for discriminating whether the fee is to be paid by the own terminal or by the terminal requesting the management information and for sending the requested management information such that the information is sent immediately to the requesting terminal when the fee is to be paid by the requesting terminal and such that the information is sent after the call is disconnected once and setup again when the fee is to be paid by the own terminal According to the present invention, using the user-to-user information attached to the call setup message for sending various command informations between the terminals, the management information stored in the facsimile apparatus is automatically transmitted without intervention of human operator and without modification of the communication routine. Further, the terminal to pay the fee can be designated arbitrarily such that the terminal requesting the information pays the fee or the terminal sending the information pays the fee by setting a massage in the user-to-user information attached to the call setup message.

Other objects and further features of the present invention will become apparent from the following detailed descriptions when read in conjunction with the attached drawings.

DETAILED DESCRIPTION

DETAILED DESCRIPTION

Figure 1:
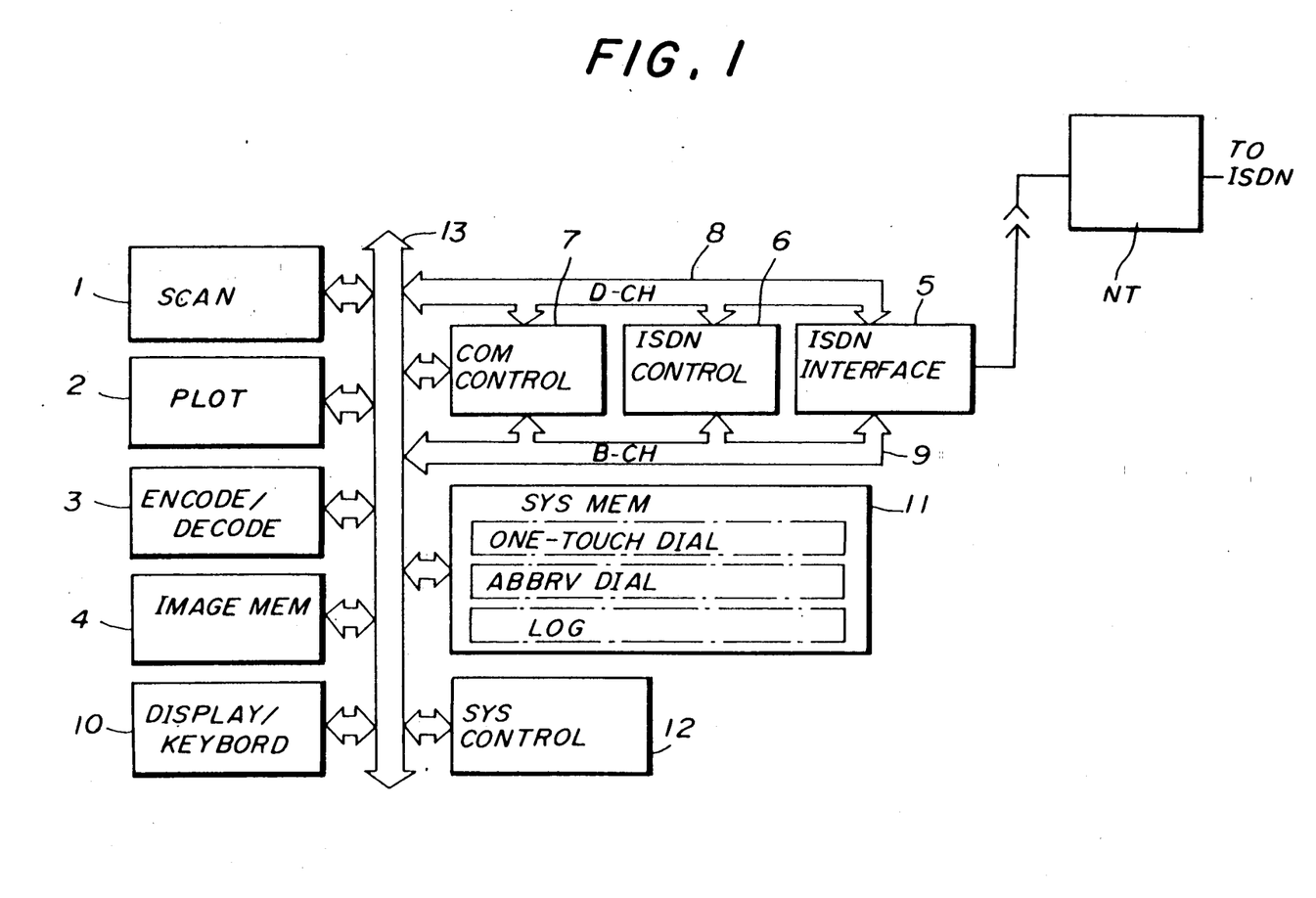
FIG. 1 is a block diagram showing a G4 facsimile apparatus for use as a terminal of an ISDN system according to an embodiment of the present invention.

FIG. 1 shows the block diagram of a G4 facsimile apparatus according to an embodiment of the present invention.

Referring to FIG. 1, the facsimile apparatus comprises a scanner 1 for extracting image informations by scanning a document and a plotter 2 for recording the image informations on a recording sheet. Further, an encoding/decoding unit 3 for encoding the image informations for data compression and for decoding the compressed data to recover the original informations is provided together with an image memory 4 for storing the image informations as necessary. Note that the foregoing parts are common in the facsimile apparatus used in general in the conventional public network.

The facsimile apparatus of the present invention designed for use in the ISDN is connected to a network terminal NT forming a part of the ISDN (referred to hereinafter simply as "the network") via an interface circuit 5 and a terminal bus. The interface circuit 5 provides a LAYER 1 function of the I-interface constructed according to the CCITT recommendation series I and exchanges signals between the terminal NT and the facsimile apparatus. Further, an ISDN controller 6 is provided for performing the function of LAYER 2 and LAYER 3 for managing the informations transferred between the facsimile apparatus and the network by using the foregoing LAYER 1 function. Furthermore, a communication controller 7 is provided for transferring the image informations according to a prescribed transfer control routine of the G4 facsimile. The foregoing interface circuit 5, ISDN controller 6 and the communication controller 7 control the transfer of signals in the signal channel or so-called D-channel via a local bus 8 and further control the transfer of informations on the information channel or so-called B-channel via a local bus 9.

The facsimile apparatus further comprises a display/keyboard unit 10 equipped with a liquid crystal display and an alphameric keyboard (not shown) for displaying an operational guidance or other informations in the form of character for use of the operator and further for inputting various commands for starting or controlling the apparatus or for registering various informations such as the one-touch dial number or the abbreviated dial number. Further, there is provided a system memory 11 for storing informations such as the one-touch dial information representing the correspondence between the registered one-touch dial number and the ISDN destination code of the terminals to which the one-touch dial number is assigned, or the communication log including the detailed content of the communication carried out by the facsimile apparatus.

Further, a system controller 12 constructed by a microcomputer system is provided for controlling the foregoing various parts of the facsimile apparatus. Note that the local buses 8 and 9 are connected to a system bus 13 for transferring the predetermined data between the foregoing various parts. Thus, the facsimile apparatus of the present embodiment has a capability of performing communication managing function such as the management of the one-touch and abbreviated dialing informations, management of communication logs, control of relay operations, and the like.

In the foregoing one-touch dialing function, each key of the ten-key keyboard is assigned with a desired destination code of the network while in the abbreviation dialing function, the destination code is assigned to the abbreviated dial numbers such as 00-99.

When using the facsimile apparatus for relaying an information at a relaying terminal, the information is relayed to a destined terminal designated by the one-touch dial number of the abbreviated dial number according to the content registered in the system memory 11 of the apparatus at the relaying terminal.

Further, the facsimile apparatus manages the communication record or log data such as the date of communication, ISDN code of the destination, length of communication, accounting and the like.

Previous to the use the facsimile apparatus, the operator registers the one-touch dial numbers or the abbreviated dial numbers as needed according to the known procedure. Responsive thereto, the dial numbers are stored in the system memory 11 as the one-touch dial information or the abbreviated dial information. After the registration, the operator can send facsimile transmission to the desired destination by performing the predetermined one-touch dialing or abbreviated dialing operation. When the communication is completed, the log information of the carried out communication is stored in the system memory 11. Further, the operator can output the list of the registered one-touch dial information and the registered abbreviated dial information as well as the communication log in a form of communication management report.

When the facsimile apparatus of the present embodiment is used at every terminals of the network, it is possible to transfer various management informations stored in the system memory 11 of the facsimile apparatus from one terminal to the other upon request. Hereinafter, description will be given for such an operation of the facsimile apparatuses including the network with reference to FIGS. 2 through 8.

When requesting the management information, the operator inputs the ISDN code of the destination terminal and a predetermined password through the display/keyboard unit 10. At the same time, designation is made for the type of the desired management information and the side which pays the fee. The foregoing designation for the type of the management information may be made by specifying one or more of the management informations such as the one-touch dial informations, abbreviated dial informations and the communication log informations, and may be performed by inputting a predetermined code number through the display/keyboard unit 10. The side which pays the fee for transferring the informations is designated also by inputting a predetermined code. The foregoing processing forms a group of steps designated as a step 101 in the flowchart of FIG. 2 which shows the operation of the facsimile apparatus of FIG. 1 in the requesting mode.

Figure 2:
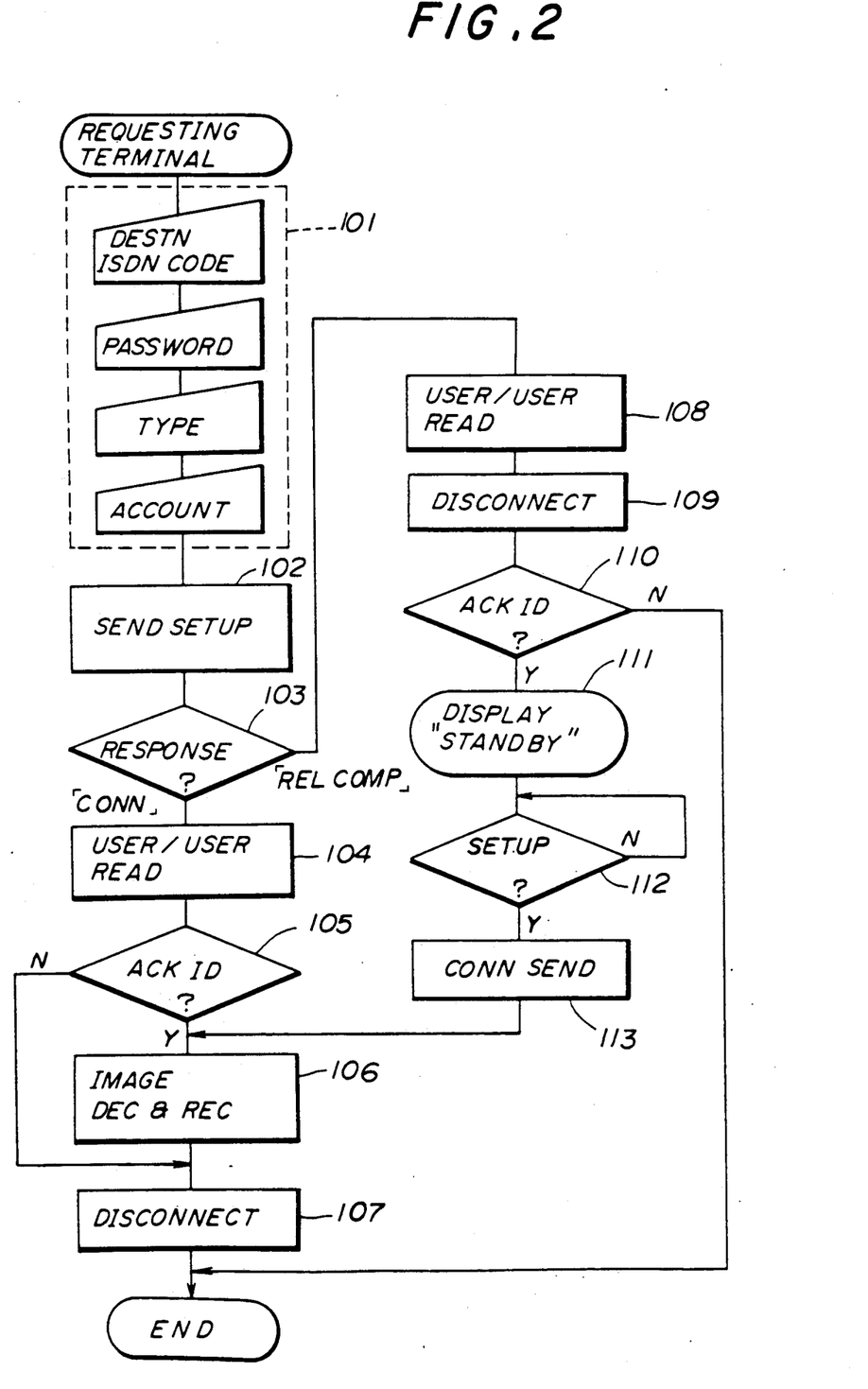
FIG. 2 is a flowchart showing the operation of the facsimile apparatus when requesting informations.

Responsive to completion of the inputting of the foregoing informations, the facsimile apparatus sends the designated informations together with a call setup message SETUP in a step 102 of FIG. 2. This message SETUP is sent to the facsimile apparatus at the terminal which is requested to provide the informations via the network as shown in FIG. 4.

Figure 3:
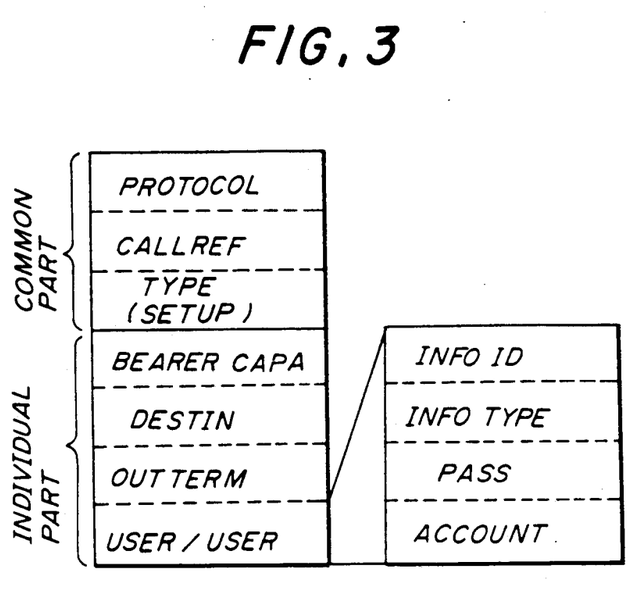
FIG. 3 is a diagram showing the structure of a call setup message SETUP.

FIG. 3 shows the structure of the call setup message SETUP. Referring to FIG. 3, the message SETUP comprises a common part which is common with the call control message of the I-interface LAYER 3 and an individual part of which content is different in each message. Note that the common part is formed from a protocol discriminator PROTOCOL, a call reference CALLREF and a message type TYPE which in this case is SETUP, while the individual part is formed from a bearer capability BEARERCAPA, a destination terminal code DESTIN, an out-going terminal code OUTTERM and a user-to-user information USER/USER.

Note that the destination terminal code DESTIN designates the ISDN code of the destined terminal and the out-going terminal code OUTTERM designates the ISDN code of the own terminal. Further, the user can set an arbitrary information in the user-to-user information USER/USER. In the present embodiment, an information request identifier INFOID indicating the existence of request for the management information, type of the requested information INFOTYPE, password PASS, as well as the information about the terminal which pays the fee ACCOUNT are set in the user-to-user information USER/USER.

Figure 4:
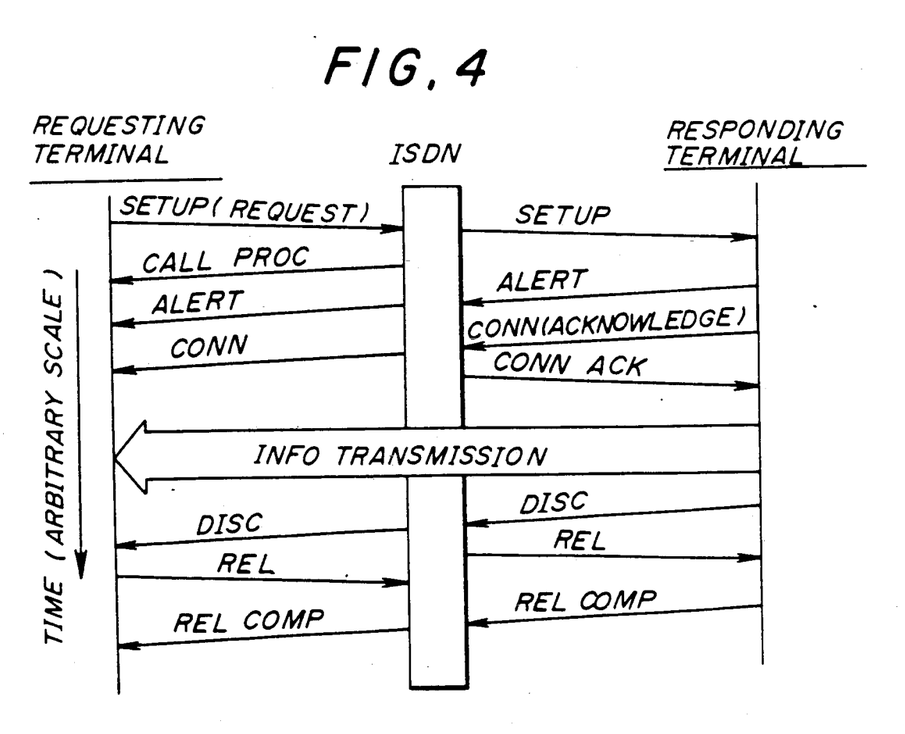
FIG. 4 is a sequence chart showing the sequence for transmitting the requested informations for a case in which the fee is paid by the terminal requesting the informations.

When the network receives the call setup message SETUP, the network returns a call setup acknowledge message CALL PROC to the out-going terminal and sends the call setup message SETUP further to the destined terminal as shown in FIG. 4.

Figure 5:
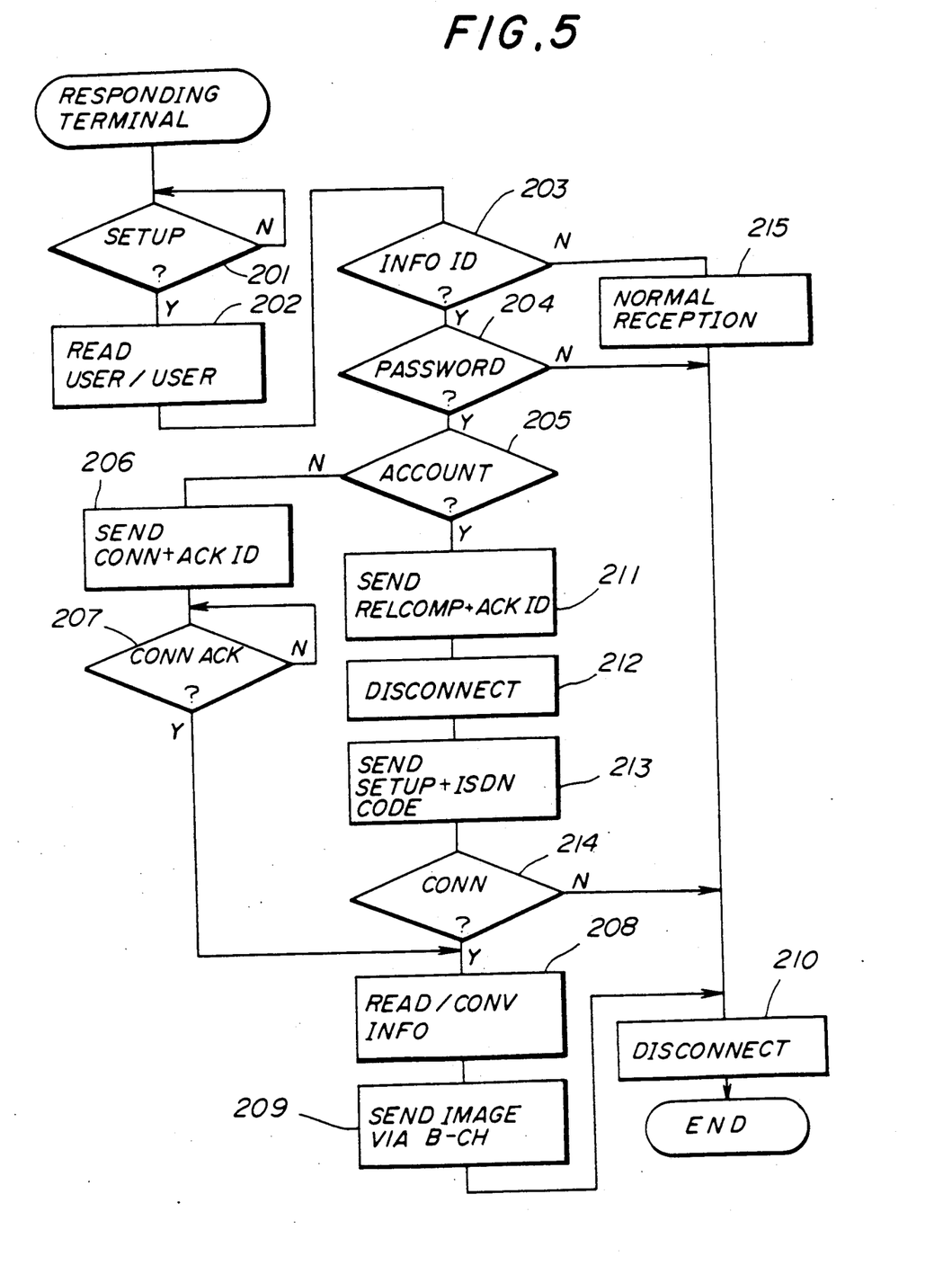
FIG. 5 is a flowchart showing the operation of the facsimile apparatus responding the request upon reception of the request for the informations.

FIG. 5 shows the process undertaken by the facsimile apparatus in the reception side for responding the request. Responsive to reception of the call setup message SETUP in a step 201, the apparatus sends a call message ALERT shown in FIG. 4 to the terminal requesting the informations via the network and further reads the user-to-user information attached to the call setup message SETUP in a step 202. When it is discriminated in a step 203 that the foregoing information request identifier INFOID is set in the message SETUP, it is discriminated further in a step 204 that the password PASS agrees to the predetermined one or not.

Figure 6:
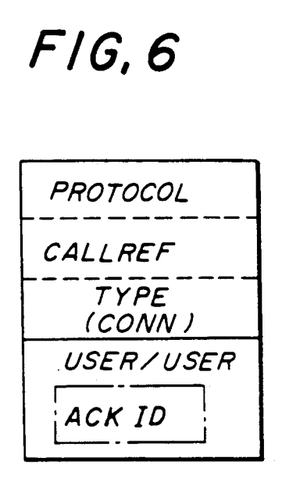
FIG. 6 is a diagram showing the structure of a response message CONN.

When the password PASS agrees, it is further discriminated which side of the terminals is to pay the fee in a step 205. When the terminal which has sent the request is designated to pay the fee, an acknowledging message CONN is sent in a step 206 as shown in FIGS. 2 and 4 together with the user-to-user information USER/USER in which an acknowledge identifier ACKID indicating that the request for the informations is accepted is attached as shown in FIG. 6. Responsive thereto, the network returns an acknowledgement message CONN ACK to the terminal ready for responding the request as shown in FIG. 4.

The apparatus at the terminal responding the request reads out, responsive to the acknowledgement message CONN ACK in a step 207, the requested management informations from the system memory 11 and converts them to the image information together with encoding in a step 208. The image informations thus encoded is sent to the network in a step 209.

Referring to FIG. 2 again, the facsimile apparatus requesting the informations, upon reception of the message CONN in a step 103, reads the content of the user-to-user information USER/USER in a step 104 and discriminates the existence of the acknowledge identifier ACKID in a step 105.

When there exists the acknowledge identifier ACKID, the management information transmitted from the foregoing facsimile apparatus through the network is decoded and the image information of the management information is recorded on the sheet in a step 106.

After this, the terminal responding the request sends a disconnection message DISC responsive to the completion of the management information as shown in FIG. 4. The network, in response to this, returns a release message REL and further sends a disconnection message DISC to the terminal requesting the information. The terminal requesting the information returns a release message REL in response thereto.

The terminal responding the request further sends a release completed message REL COM responsive to the reception of the message REL as shown in FIG. 4. Upon reception of the message REL COM, the network sends this message to the terminal requesting the information. Thus, the both facsimile apparatuses carry out the predetermined call disconnection procedure (step 107 of FIG. 2, step 210 of FIG. 5).

Figure 7:
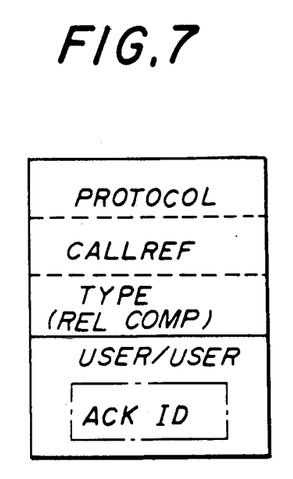
FIG. 7 is a diagram showing the structure of a message REL COMP indicating that the release of the information is completed.
Figure 8:
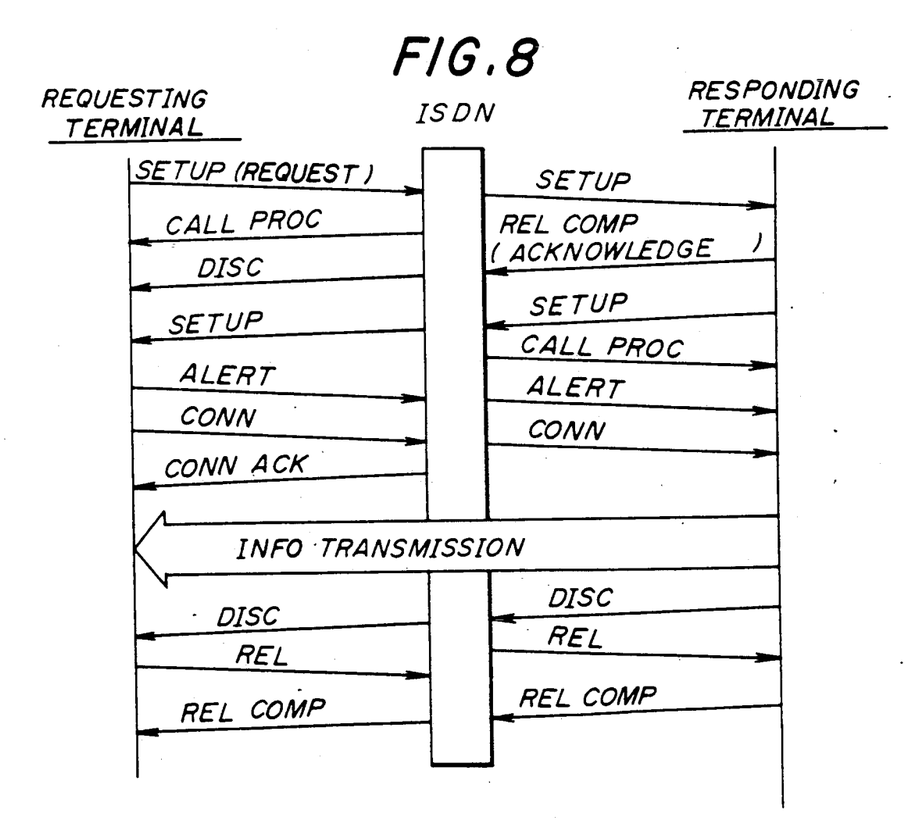
FIG. 8 is a sequence chart showing the sequence for transmitting the requested informations for a case where the fee is paid by the terminal sending the requested informations.

In the case that it is discriminated in the step 205 that the payment of the fee is designated to the terminal responding the request, on the other hand, the facsimile apparatus at the terminal responding the request sends, as shown in FIG. 8, a release complete message REL-COMP of which structure is shown in FIG. 7 in which the ACKID is set in the user-to-user information USER/USER in a step 211, to the terminal requesting the informations via the network.

The terminal requesting the informations, upon reception of the message REL COMP in the step 103 of FIG. 2, reads the content of the user-to-user information USER/USER in a step 108. Thereafter, the facsimile apparatuses at the both terminals carry out the call disconnection routine in a step 109 of FIG. 2 and in a step 212 of FIG. 5.

The terminal requesting the information then discriminates the existence of the ACKID in the user-to-user information USER/USER attached to the message REL COMP in a step 110 and in the case where there exists the ACKID, a message is displayed on a screen of the display/keyboard unit 10 indicating that the facsimile apparatus is waiting for the reception of the managing informations in a step 111 and waits for the call out in a step 112 from the terminal supplying the requested informations.

The terminal responding the request, on the other hand, calls out the terminal requesting the informations in a step 213 of FIG. 5 after the disconnection by sending the call setup message SETUP shown in FIG. 8 together with the ISDN code number of the terminal to be connected. The terminal requesting the informations, in response to the reception of the call setup message SETUP, sends the acknowledgement message CONN shown in FIG. 8 in a step 113 of FIG. 2 according to the predetermined routine.

Upon reception of the message CONN in a step 214, the terminal responding the request sends the requested management informations by performing the step 208. The terminal requesting the informations receives the management informations and records the informations on the sheet in a step 106 of FIG. 2. The procedures performed thereafter are identical to the case already described where the accounting fee is paid by the terminal requesting the informations.

Meanwhile, there may be a case in which the terminal requested for sending the informations is an ordinary facsimile terminal and not equipped with the foregoing functions which are needed in the embodiment of the present invention. In such a case, the acknowledgement identifier ACKID is not received in the acknowledgement message CONN from the terminal requested for the information. In such a case, the result of discrimination in the step 105 of FIG. 2 becomes NO and the call is immediately disconnected in the step 107.

Further, when the password does not agree upon reception of the information request identifier INFOID in the terminal responding the request as in the case where the result of discrimination in the step 204 is NO, the call is immediately disconnected.

Further, when the incoming call is an ordinary call not requesting the management informations, the call setup message SETUP is without the information request identifier INFOID. In such a case, the result of discrimination in the step 203 of FIG. 5 becomes NO and an ordinary acknowledgement message CONN is returned. Responsive thereto, an ordinary facsimile reception is performed in a step 215.

As described heretofore, by using the facsimile apparatus of the present invention as the terminal of ISDN, various managing informations are printed out not only in the same facsimile apparatus but also in other facsimile apparatuses in the remote terminals by simply setting the request INFOID in the user-to-user information USER/USER attached to the call setup message SETUP. In other words, the management informations can be sent automatically upon request to other terminals without intervention of human operators and without modifying the communication routine for transmitting necessary command informations.

Further, by using the user-to-user information USER/USER for desigation of the side which pays the accounting fee, and by constructing the ISDN system such that the call is once disconnected and again connected by calling out from the terminal requested for the informations, it becomes possible to select arbitrarily the side which pays the fee.

In the embodiment described heretofore, the acknowledge identifier ACKID from the terminal responding to the request is sent to the terminal requesting the informations by setting this identifier in the user-to-user information of the CONN message of REL COMP message. However, the manner of sending the identifier ACKID is not limited as such but may be sent together with other messages such as the call message ALERT.

Further, the informations to be sent upon request is not limited to the registered one-touch or abbreviated dial informations or the communication logs but other management informations can be send similarly to the present embodiment.

Further, it is possible to provide the system memory 11 of FIG. 1 for storing various management informations in a form of a random access memory RAM in the system controller 12 in stead of providing separately.

Further, the present invention is not limited to the G4 mode facsimile apparatus but is also applicable to the G2/G3 mode apparatuses also.

Further, the present invention is not limited to these embodiments but various variations and modifications may be made without departing from the scope of the invention.

What is claimed is:

1. A facsimile apparatus for communicating via an integrated service digital network, comprising:

scanning means for extracting an image information from a document;

first communication control means connected to the network for at least one of establishing and disconnecting a communication channel to other terminals via the network by at least one of sending and receiving predetermined messages including a call setup message to and from the network;

second communication control means provided between the scanning means and the network for at least one of sending the extracted image information to the network and receiving an image information from the network along the established communication channel;

memory means connected to the first communication control means for storing management information at least including information arbitrarily registered by an operator for controlling the operation of the first communication control means and a log of communications carried out by the facsimile apparatus;

outputting means connected to the network via the second communication control means for outputting the received image information on a sheet;

first reading means connected to the first communication control means for reading the content of a user information attached to the call setup message upon reception and acceptance of a call from other terminals sent via the network;

discrimination means connected to the reading means for discriminating the existence, in the user information, of a request for sending a management information to the terminal which has sent the call and further for identifying the type of the requested management information;

second reading means connected to the memory means for reading out the requested management information according to the type identified by the discrimination means; and conversion means provided between the second reading means and the second connection control means for converting the requested management information into an image information and for supplying the requested management information thus converted to the second communication control means for transmission to the terminal requesting the management information via the network;

wherein said discrimination means further discriminates, on the basis of the user information read by the first reading means, whether an accounting fee for sending the requested information is to be paid by the side of the facsimile apparatus or the side of the terminal requesting the information, the facsimile apparatus further comprises a system controller connected to the discrimination means for controlling the first and second communication control means such that the requested information is immediately sent to the terminal requesting the information when it is discriminated that the side of the terminal requesting the information is to pay the accounting fee and such that the requested information is sent to the terminal requesting the information after the established connection is once disconnected and again established by calling the terminal requesting the information from the side of the facsimile apparatus when it is discriminated that the side of the facsimile apparatus is to pay the accounting fee.

2. A facsimile apparatus as claimed in claim 1 in which said first and second reading means, said discrimination means and said conversion means are provided in a part of the system controller, the system controller is connected to the first and second communication control means and further to the memory means via a system bus.

3. A facsimile apparatus as claimed in claim 1 in which said first and second communication control means comprise commonly an interface circuit and a connection control unit respectively performing the functions of the layer 1 and the layers 2 and 3 prescribed by the CCITT series I recommendation, said first communication control means further has a signal channel for transferring the predetermined messages including the call set up message, and said second communication control means further has an information channel for transferring the image information.

4. A facsimile apparatus as claimed in claim 3 in which said first and second communication control means further comprise commonly a communication control unit which controls the transmission of the image informations according to the transmission control sequence of an G4 facsimile apparatus.

5. A method of transmitting a management information stored in a memory of a facsimile apparatus via an integrated digital service network in a form of an image information upon request, comprising steps of:
   establishing a connection upon reception of a call setup message sent via the network from a terminal connected to the network;
   reading the content of a user information attached to the call setup message;
   discriminating, on the basis of the user information, whether there is a request to send a management information;
   discriminating, on the basis of the content of the user information, whether an account fee for sending the requested management information via the network is paid by the terminal requesting the management information or by the side of the facsimile apparatus responding the request;
   sending the requested management information when it is discriminated that the account fee is paid by the terminal requesting the management information; and
   disconnecting the established connection once and then reestablishing when it is discriminated that the account fee is to be paid by the side of the facsimile apparatus, and sending the requested management information along the reestablished connection.

* * * * *